United States Patent
Bray et al.

(10) Patent No.: US 10,911,379 B1
(45) Date of Patent: Feb. 2, 2021

(54) MESSAGE SCHEMA MANAGEMENT SERVICE FOR HETEROGENEOUS EVENT-DRIVEN COMPUTING ENVIRONMENTS

(71) Applicant: Amazon Technologies, Inc., Seattle, WA (US)

(72) Inventors: Timothy William Bray, Vancouver (CA); Ali Baghani, Vancouver (CA); Jakub Mateusz Narloch, Vancouver (CA); Jamie Christopher Dool, Kitchener (CA); Ahmed Usman Khalid, Port Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/439,545

(22) Filed: Jun. 12, 2019

(51) Int. Cl.
 G06F 9/44 (2018.01)
 H04L 12/58 (2006.01)
 G06F 16/242 (2019.01)

(52) U.S. Cl.
 CPC .............. *H04L 51/066* (2013.01); *G06F 9/44* (2013.01); *G06F 16/2423* (2019.01); *H04L 51/046* (2013.01); *H04L 51/063* (2013.01); *H04L 51/18* (2013.01)

(58) Field of Classification Search
 CPC ............... G06F 16/284; G06F 11/0706; G06F 11/0769; G06F 11/3664; G06F 40/221; G06F 9/44; G06F 9/44505; G06F 16/2423
 See application file for complete search history.

(56) References Cited

U.S. PATENT DOCUMENTS

| | | | |
|---|---|---|---|
| 7,720,931 B2 * | 5/2010 | Mei | G06F 9/44505 707/715 |
| 7,970,730 B2 | 6/2011 | Meijer et al. | |
| 8,543,534 B2 * | 9/2013 | Alves | G06F 9/541 707/600 |
| 8,732,213 B2 | 5/2014 | Sowell et al. | |
| 8,863,079 B2 * | 10/2014 | Darcy | G06F 8/437 717/108 |
| 9,613,068 B2 | 4/2017 | Tsirogiannis et al. | |
| 9,977,817 B2 | 5/2018 | Galle et al. | |
| 2004/0025117 A1 * | 2/2004 | Ingersoll | G06F 40/154 715/234 |
| 2007/0283150 A1 * | 12/2007 | Cozianu | H04L 63/0428 713/168 |
| 2013/0167139 A1 * | 6/2013 | Arcilla | G06F 9/44505 717/175 |
| 2014/0279838 A1 * | 9/2014 | Tsirogiannis | G06F 16/235 707/603 |

(Continued)

OTHER PUBLICATIONS

"Amazon CloudWatch: User Guide", Amazon 2019, pp. 1-221.

(Continued)

*Primary Examiner* — Chirag R Patel
(74) *Attorney, Agent, or Firm* — Robert C. Kowert; Kowert, Hood, Munyon, Rankin & Goetzel, P.C.

(57) ABSTRACT

Based on analysis of messages transmitted to a communication channel, a schema for a category of messages is generated. The schema indicates one or more data types and an ordering of instances of the data types. The schema is stored in a registry. A code artifact generated in accordance with the schema is provided to automate event processing tasks associated with the message category.

20 Claims, 10 Drawing Sheets

(56) References Cited

U.S. PATENT DOCUMENTS

2015/0269193 A1* 9/2015 King ................. G06F 40/221
707/694
2018/0089232 A1 3/2018 Spektor et al.

OTHER PUBLICATIONS

Dario Colazzo et al, "Typing Massive JSON Datasets", 2012, pp. 1-4.
"What i Azure Logic Apps", (Enterprise integration with Azure Logic Apps), pp. 1-8.
Developer Guide, "Amazon Kinesis Data Streams", 2019, pp. 1-178.

* cited by examiner

MESSAGE SCHEMA MANAGEMENT SERVICE FOR HETEROGENEOUS EVENT-DRIVEN COMPUTING ENVIRONMENTS

BACKGROUND

In recent years, more and more large software applications and services are being run using distributed sets of interconnected resources, for example in cloud-based data centers, thereby reducing the need for application owners to maintain expensive application execution environments at their own premises. Many non-business activities, such as social media interactions and the like, are also increasingly being organized and managed using distributed or cloud-based applications. In some cases, a sophisticated application or service may utilize multiple communicating components or modules that were developed independently of each other, e.g., by several different software vendors.

The communications between the various interacting components of a service or application may be synchronous in some cases, as when application programming interfaces (APIs) with strongly typed call signatures are invoked for the communications. When an API is invoked, the caller may block until the callee completes the requested operation and responds.

In a contrasting approach towards large-scale application design that is becoming increasingly popular, components of an application or service may instead exchange streams of asynchronous messages, with individual messages representing respective events. When a component detects an event of interest based on analyzing such a message, it may perform some operations and in turn eventually generate another message indicating the completion of its operations. Such an approach is referred to as event-based programming. Event-based applications have certain advantages relative to API-based systems, in that the application components are more loosely coupled, and the applications can often respond more effectively to variations in workload levels and differences in component performance capacities. However, in many cases, especially in scenarios where the components of a higher-level application or service may be developed by different vendors or designers, the structure of the messages transmitted from the components may not be defined as strictly as the signatures of API calls. Analyzing and responding to asynchronous messages which are not strongly typed, especially in environments in which messages are generated at very high volumes from heterogeneous collections of message producers, may represent a non-trivial technical challenge.

Figure 1:
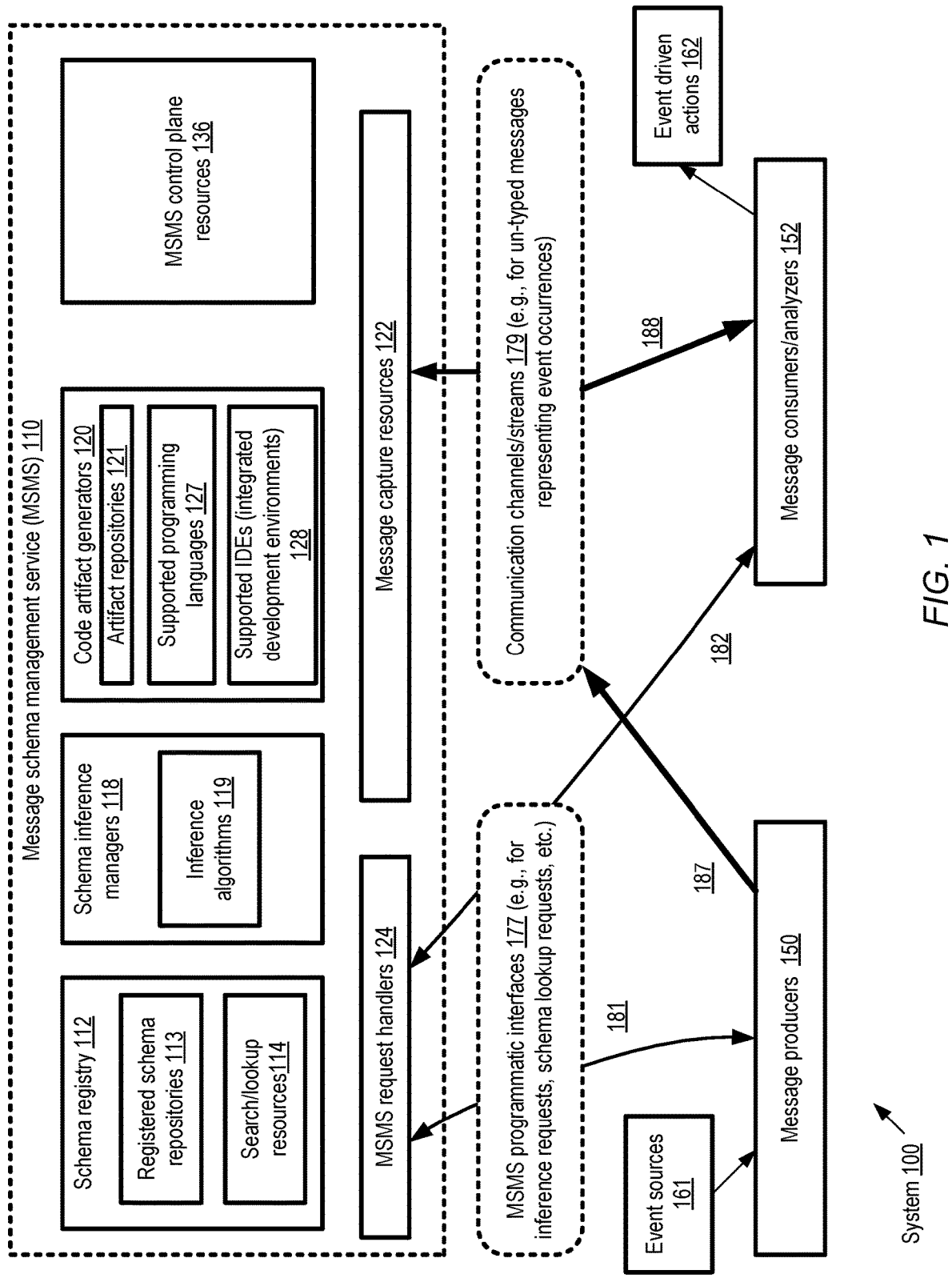
FIG. 1 illustrates an example system environment in which a schema management service for messages from a heterogeneous collection of sources which do not provide message schemas may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing a network-accessible service which automatically infers schemas for un-typed messages from a variety of message sources for use in an event-driven application environment are described. Generally speaking, a schema may comprise a set of constraints on allowable messages, indicating, for example, some collection of necessary conditions (e.g., required elements) that have to be satisfied for messages to be considered acceptable. Schemas may also in some embodiments define optional conditions for message acceptability, as when a message may include instances of one or more of several alternative elements. Numerous messages comprising a respective data payload (comprising various elements of information pertaining to one or more events), and at least in some cases also comprising one or more metadata subcomponents (e.g., a timestamp representing the time at which the message was generated or submitted, or an indication of the identity of the message source) may be submitted by message producers to a communication channel in various embodiments. A message may be deemed to be un-typed in such embodiments if the producer or the source of the message does not provide a schema indicating the data types of constituent elements of the messages; that is, guidance regarding how the data payload of the messages is to be interpreted may not be made available in advance to potential recipients of the messages.

According to some embodiments, a message scheme management service (MSMS) may include resources that perform some combination of the following types of operations with respect to such un-typed messages. The MSMS may sample a (potentially large) collection of un-typed messages, analyze the data payloads of the messages to detect common patterns, and automatically infer a schema for at least a subset of the message data payloads. The schema may in effect represent a tight data typing contract that governs the content expected within the message data payloads, without requiring the message senders or recipients to necessarily formalize such a contract. Furthermore, in at least some embodiments, inferred schemas may be stored in a repository, and programmatic interfaces for searching, querying, modifying and/or creating new versions of the inferred schemas may be provided by the MSMS. In various embodiments, the MSMS may also automatically generate and propagate code artifacts such as serialization libraries that can be used by programmers or other users to analyze the contents of the un-typed messages for which schemas have been inferred. In one embodiment, for example, a set of code artifacts generated by an MSMS for one or more categories of un-typed messages may be incorporated within integrated development environments or other programming tools, enabling the data payloads of un-typed messages to be automatically converted into programming language objects whose attributes or fields can be accessed and manipulated to implement desired event processing tasks. The programming tools enhanced with the help of the MSMS may provide ease-of-use features like auto-completion of tokens representing inferred data type instances or fields of such instances, exception handling for malformed messages, debugging facilities that enable inspection of instances of inferred data types, and so on.

As one skilled in the art will appreciate in light of this disclosure, certain embodiments may be capable of achieving various advantages and practical applications/benefits, including some or all of the following: (a) enabling very high volumes of messages to be processed efficiently in an event-driven application environment, without for example requiring programmers to have to write code to extract contents of individual messages and attempt to impose structure on the contents, (b) enhancing the robustness of event processing applications, e.g., by reducing the probabilities of incorrect interpretations of event messages, and by providing reliable mechanisms to deal with malformed messages, (c) enhancing the user experience of programmers tasked with designing and developing applications for generating and publishing messages representing events, as well as programmers tasked with designing and developing message-based event processing applications.

According to some embodiments, a system may comprise one or more computing devices of a message schema management service (MSMS). The devices may include instructions that upon execution on or across one or more processors cause the one or more computing devices to capture or obtain a set of messages published to a communication channel by one or more message producers. Any of a number of different types of communication channels may be used in different embodiments, such as message busses supporting a publish-subscribe model, message queues implemented at a provider network or cloud based messaging service, channels to which e-mails, text messages or social media messages may be transmitted from cell phones or other mobile devices, and so on. Individual ones of the messages may represent respective sets of one or more events in some embodiments. Note that at least in some embodiments, capturing a message from the communication channel may simply comprise copying the message, without deleting/removing the message from the channel; as such, the extraction of a message by the MSMS may not prevent potential recipients of the message from also capturing the message. In various embodiments, the messages themselves may not specify object types or data types of their message contents, and schemas for interpreting message contents may not be provided to the MSMS from an external source (such as the message producers). In some embodiments, rules or criteria for identifying messages that belong to a particular logical category may be provided to the MSMS, e.g., by message producers, and such rules/criteria may be used to select, from a larger stream of messages transmitted to the communication channel, the set of messages for which a schema is to be inferred. In at least one embodiment, if/when a message producer is about to start issuing messages of a new type to a communication channel, the message producer may transmit a message (e.g., a message sample submission notification) to the MSMS, in effect advising the MSMS to start capturing samples of the messages.

The computing devices of the MSMS may generate, based at least in part on an analysis of the set of captured messages, a schema for a category of messages in various embodiments. The inferred schema may include at least respective indications of (a) one or more inferred object types or data types and (b) an ordering of instances of the one or more inferred object types or data types within a message of the category. More generally, as mentioned earlier, the inferred schema may indicate constraints that have to be satisfied by a given message for that message to be designated as an acceptable example of the category in various embodiments. In some embodiments, each schema may be assigned a version number, and minor changes to the message content organization over time may be accommodated at the MSMS by generating newer versions of the same underlying schema. Any of a number of different inference techniques may be employed to generate the schemas in different embodiments. For example, in one embodiment, after a an example message assumed to belong to a category has been obtained from the communication channel, it may be parsed into a set of tokens representing instances of primitive data types such as numerals, strings, and the like, and the tokens may be arranged into an initial proposed schema represented by a graph. Then, additional messages assumed to belong to the same category may be parsed, with the graph representations of parsed tokens of the additional messages being compared to the arrangement of data type instances in the initial proposed schema graph. The initial proposed schema graph may be modified if needed, e.g., based on variations observed in the additional message graphs relative to the initial proposed schema. Such gradual modification of the initial proposed schema may be referred to as "fusing" schemas in some embodiments. Some nodes of the modified graph of a fused schema may for example allow instances of alternative data types, or may allow null values or absent instances of data types. After some number of message samples have been analyzed, with corresponding changes/variations in message data payload structure incorporated into the initial proposed schema, an approved version of the schema may be designated in such embodiments. Note that additional changes may later be applied to the approved versions in various embodiments, based on automated analysis of new message samples, or based on programmatic requests from message producers or consumers, resulting in newer approved versions of the schema. In some embodiments, a client (e.g., a message producer or consumer) may submit a schema inference request to the MSMS; in other embodiments, schema inference may be performed automatically by an MSMS for messages observed on a particular communication channel, without requiring specific inference requests to be submitted.

In at least some embodiments, after a version of a schema has been inferred based on the analysis of a set of messages, the schema may be registered or included within a repository of inferred schemas of the MSMS. In one embodiment, the MSMS may be responsible for inferring schemas for various categories of messages transmitted over numerous different communication channels, and a respective repository of inferred schemas may be registered and stored for each channel; in other embodiments, a global repository may be used to register and store schemas for messages following over numerous channels. In some cases, a message producer or consumer may submit a programmatic request to register a schema, while in other embodiments, the MSMS may automatically register a schema without requiring a specific programmatic request to be submitted. The registry or repository may support searches and/or other types of queries directed to the stored schemas or schema versions in various embodiments. For example, a client of the MSMS, such as a message producer or consumer, may submit a schema query via a programmatic interface, indicating one or more predicates or criteria, and the MSMS may provide indications of registered schemas that satisfy the predicates or criteria. The registry maintained by the MSMS may thus represent a source of information which can be consulted by message producers (e.g., to determine how message data payloads should be organized), by message consumers (e.g., to determine the kinds of messages have been transmitted via the communication channel in the past), and/or by other MSMS clients (e.g., system administrators of large-scale event-driven applications, to understand the types of information being exchanged between various components of the applications).

According to one embodiment, the MSMS may automatically generate and provide code artifacts corresponding to various registered schemas or schema versions. For example, an artifact request may be received via a programmatic interface from a message consumer, indicating a particular schema and a target programming environment (e.g., the name/version of a preferred programming language, an integrated development environment (IDE) or the like). In response to such a request, computing devices of the MSMS may transmit one or more automatically generated code artifacts (such as libraries of modules in a targeted programming language), which may be used to automate at least a portion of an event processing task for messages of one or more categories. For example, the task of parsing message contents and converting them to objects within a programming language of choice, such as Java™, Python or the like, may be automated with the help of the code artifacts in some embodiments. The attributes or fields of the programming language objects may then be accessed and manipulated to perform various types of event processing in different embodiments—e.g., notification messages directed to various destinations, indicating that one or more new events have been indicated by a message may be generated, a transaction to order additional items based on an event that indicates a low supply of an item may be initiated, and so on. In at least some embodiments, the code artifacts generated at the MSMS may incorporate one or more types of automated handling of exceptions or malformed messages—e.g., a code artifact may include logic or code to present, to a message consumer, an indication of an error encountered during analysis of a message which (a) meets one or more criteria or constraints for inclusion in a particular category and (b) does not satisfy one or more elements of a schema inferred for the particular category.

In some embodiments, if a message that meets some criteria for being considered a member of a particular category nevertheless does not satisfy the inferred schema for the category, the MSMS may attempt to determine whether the inferred schema should be modified (e.g., whether a new version of the schema that can accommodate the message should be generated and registered). For example, if processing of a message (or a set of messages) causes a code artifact generated for an inferred schema to fail (i.e., if an error report is generated or a program incorporating the code artifact crashes), the MSMS may attempt to identify a modification to the code artifact that would prevent the failure if similar messages are encountered in the future. In at least some embodiments, before modifying the code artifact or the underlying inferred schema, the MSMS may obtain approval (e.g., from the message producer responsible for the failure-causing message) for the proposed changes via a programmatic interface.

Example System Environment

FIG. 1 illustrates an example system environment in which a schema management service for messages from a heterogeneous collection of sources which do not provide message schemas may be implemented, according to at least some embodiments. As shown, system 100 may comprise resources, artifacts and repositories of a message schema management service (MSMS) 110, including schema inference managers 118, code artifact generators 120, a schema registry 112, message capture resources 122, request handlers 124 and a set of administrative or control plane resources 136. Individual ones of these subcomponents of the MSMS 110 may be implemented using a combination of hardware and software at one or more computing devices in various embodiments.

The MSMS 110 may implement one or more programmatic interfaces 177 which can be used by clients (e.g., message producers 150, message consumers 152 and/or other types of clients) to submit message schema-related requests and receive corresponding responses in the depicted embodiment, as indicated by arrows 181 and 182. Interfaces 177 may for example include a set of application programming interfaces (APIs), command-line tools, graphical user interfaces, web-based consoles or the like in some embodiments. The programmatic requests submitted by MSMS clients may be received at one or more request handlers 124 and distributed by the request handlers to the appropriate internal component of the MSMS—e.g., configuration-related requests (e.g., requests to start capturing message samples and schema inference for a category of messages) may be transmitted to the control plane resources 136, registry queries may be transmitted to the schema registry 112, code artifact requests may be transmitted to the code artifact generators 120, and so on. Responses to client requests may flow in the reverse direction, from the internal MSMS component to the client via the request handlers in various embodiments.

In the embodiment depicted in FIG. 1, one or more message producers 150 may transmit a plurality of messages onto one or more communication channels or streams 179, as indicated by arrow 187. Using resources 122, at least a subset or sample of the messages may be extracted or captured at the MSMS. Individual messages may represent one or more events in various embodiments, e.g., events that are generated at one or more event sources 161 and detected using one or more event sensors accessible to the message producers. Instances of any of a wide variety of event types may be represented by corresponding messages generated by a message producer 150 in the depicted embodiment—e.g., a given message may indicate the initiation or completion of a task at a network-accessible service, the capture of an environmental metric at a sensor, the determination that a measurement falls outside acceptable bounds, and so on. In some cases the message producer may itself be an event source—that is, some types of message producers 150 may submit messages to a channel without having obtained an indication of an event external to the message producers. Various types of communication channels/streams 179 may be used for the messages in different embodiments, such as message busses that support a publish/subscribe model, message queues or other mechanisms supported by cloud-based messaging services, social media message mechanisms, e-mail platforms, text message platforms, and so on.

Message capture resources 122 may for example comprise one or more computing devices that have been granted read access or subscriptions to the communication channels/streams 179. At least a subset of the messages transmitted to the channels/streams may be un-typed in the depicted embodiment, that is, an indication of the constituent object types, data types, or schema of the data payloads may not be provided to potential message consumers/analyzers 152 by the message producers. Schema details may not be included within the messages themselves, for example, nor may schema details be provided by the message producers via other mechanisms in at least some embodiments. In various embodiments, specific rules to be used to construct messages may not have been agreed upon with message consumers in advance by at least some message producers 150. In some embodiments, at least some of the messages transmitted to the communication channels/streams 179 may not necessarily even specify their intended recipients—that is, the message producers may simply submit messages to the channel under the assumption that, if any action is to be taken in response to a given event represented by a message, a message consumer or analyzer 152 will extract the message from the channel (as indicated by arrow 188) and initiate the appropriate event-driven action 162. In one embodiment, one or more message producers 150 may belong to a different business entity or organization than one or more message consumers 152. In various embodiments, the message capture resources 122 may be configured to extract the messages in a non-destructive manner—that is, the messages may not be removed or deleted from the communication channels by the capture resources.

In some embodiments, messages may be extracted/captured at the MSMS 110 in response to specific programmatic requests received via interfaces 177. For example, a message producer 150 may submit a command or request to the MSMS 110 indicating that examples or samples of a category of event message are going to be transmitted to a given communication channel 179, and the MSMS 110 may start capturing such event messages. In one embodiment, a message producer 150 and/or a message consumer 152 may submit a programmatic request to request that schema inference be initiated for messages being transmitted onto a channel 179. In some embodiments, a rule that can be used to identify messages of a particular category for which the schema is to be inferred may be provided via an interface 177 to the MSMS 110. For example, a message producer may include a message category indicator token (e.g., "Event-10-message") in the first few bytes of message payload or in a header of a message and provide an indication of the token to the MSMS programmatically, and the message capture resources 122 may utilize the token to identify the messages for which schema inference is to be initiated at the MSMS 110. In some embodiments, specific requests may not be submitted to the MSMS to initiate message capture or schema inference—instead, the MSMS may by default capture at least s subset of messages on a given channel, and apply one or more schema inference algorithms 119 on the messages.

Based at least in part on analysis of a set of un-typed messages captured from a communication channel 179, one or more schema inference managers 118 may generate at least one version of a schema for messages belonging to a message category represented by the set in various embodiments. The schema version may indicate a set of inferred constraints that have to be met for a message to be considered a valid example of the category. The schema version may include, for example, one or more inferred object types or data types, and an ordering of instances of the one or more inferred object/data types within a message of the category. Any of a number of different inference algorithms 119 may be employed, singly or in combination, in different embodiments. According to one algorithm, for example, the bytes that make up a data payload of a message may be parsed to identify tokens representing instances of various primitive data types such as integers, strings, real numbers and the like, and an initial proposed schema for the message category to which the message is assumed to belong may be generated. The initial proposed schema may comprise a graph with a plurality of nodes, with the nodes representing instances of data types, and with edges indicating sequencing among the data types. Similar graphs representing initial proposed schemas may be constructed for numerous captured messages, and then fused or combined, with nodes in the combined/fused graph representing alternatives of data type instances, null-able or optional instances, and so on. A final version of a proposed schema may thus be prepared by starting with a proposed schema for some set of messages and then modifying the initial proposed schema based on variations/differences identified in other messages in such an embodiment. In one embodiment, a parallel computing methodology may be employed in a schema inference algorithm 119, with initial schemas being generated from a plurality of messages in parallel, and then merged/fused in a second phase of the methodology. In at least some embodiments, an indication that a schema has been inferred for a set of messages may be provided via a programmatic interface 177, e.g., to an MSMS client that produced the messages, a client that intends to consumes the messages, and/or a client that requested the inference.

According to some embodiments, after a schema has been inferred for a category or set of messages, the schema may be registered or stored in a repository at the MSMS. A schema registry 112 may comprise one or more persistent storage repositories 113 at which the inferred schemas are stored in the depicted embodiment, as well as a set of search/lookup resources 114 (e.g., search indexes based on various attributes of the inferred schemas). In some embodiments, inferred schemas may be registered by default; in other embodiments, a programmatic request from an MSMS client such as a message producer or consumer may lead to the registration of a given schema. In response to a query received via a programmatic interface 177 from a message consumer or other MSMS client, an indication of one or more registered schemas which satisfy a criterion indicated in the query may be provided in various embodiments. The criterion may for example include identification information of a message producer for whose messages a schema was inferred, one or more data types or object types included in a schema, timestamps associated with one or more messages from which a schema was inferred, and/or schema version numbers or names in various embodiments. In at least one embodiment, a query may provide one or more examples of un-typed messages, and request that a schema which was inferred for the messages, or a schema that is applicable to or matched by the messages, be provided in response.

In the embodiment depicted in FIG. 1, in addition to inferring and registering schemas, the MSMS 110 may also provide code artifacts to message consumers/analyzers 152 to help automate event processing tasks based on the analysis of the event-representing un-typed messages transmitted by the message producers 150 on channels 179. Code artifact generators 120, implemented at one or more computing devices of the MSMS 110, may be configured to generate serialization libraries and/or other types of programming artifacts in any of a number of different supported programming languages 127 and/or for inclusion/integration within any of a set of integrated development environments (IDEs) 128 in the depicted embodiment. In at least some embodiments, such code artifacts may be generated by default for inferred and/or registered schemas at the MSMS 1110. In other embodiments, code artifacts may be generated and/or provided in response to programmatic requests received via interfaces 177. One or more artifact repositories 121 may be used to store the generated code artifacts in the depicted embodiment, e.g., in source code form, in the form of executable code and/or in the form of interpretable scripts. An MSMS client such as a message consumer 152 may submit an artifact request via a programmatic interface 177, indicating a particular schema that has been inferred and/or registered (e.g., a schema identified in response to a query submitted by the MSMS client) in various embodiments. In response, the MSMS 110 may provide one or more automatically generated code artifacts, including at least one artifact generated in accordance with the specified schema to automate at least a portion of an event processing task for events indicated in messages of a message category for which the schema was generated. The message consumer 152 may then utilize the code artifact(s) to analyze messages of the category, and initiate one or more event-driven actions 162—e.g., modifying configuration parameters of a network-accessible service, generating a notification or log message, placing an order for additional items to be added to an inventory, and so on.

In various embodiments, the MSMS control plane resources 136 may be responsible for provisioning resources for the other components of the MSMS (such as the registry 112, the inference managers 118, the request handlers 124, the code artifact generators 120 and the message capture resources 122), monitoring the health and responsiveness of the resources, verifying that requesters of schema inference have the appropriate permissions, and so on.

Example Schema-Related Workflow

Figure 2:
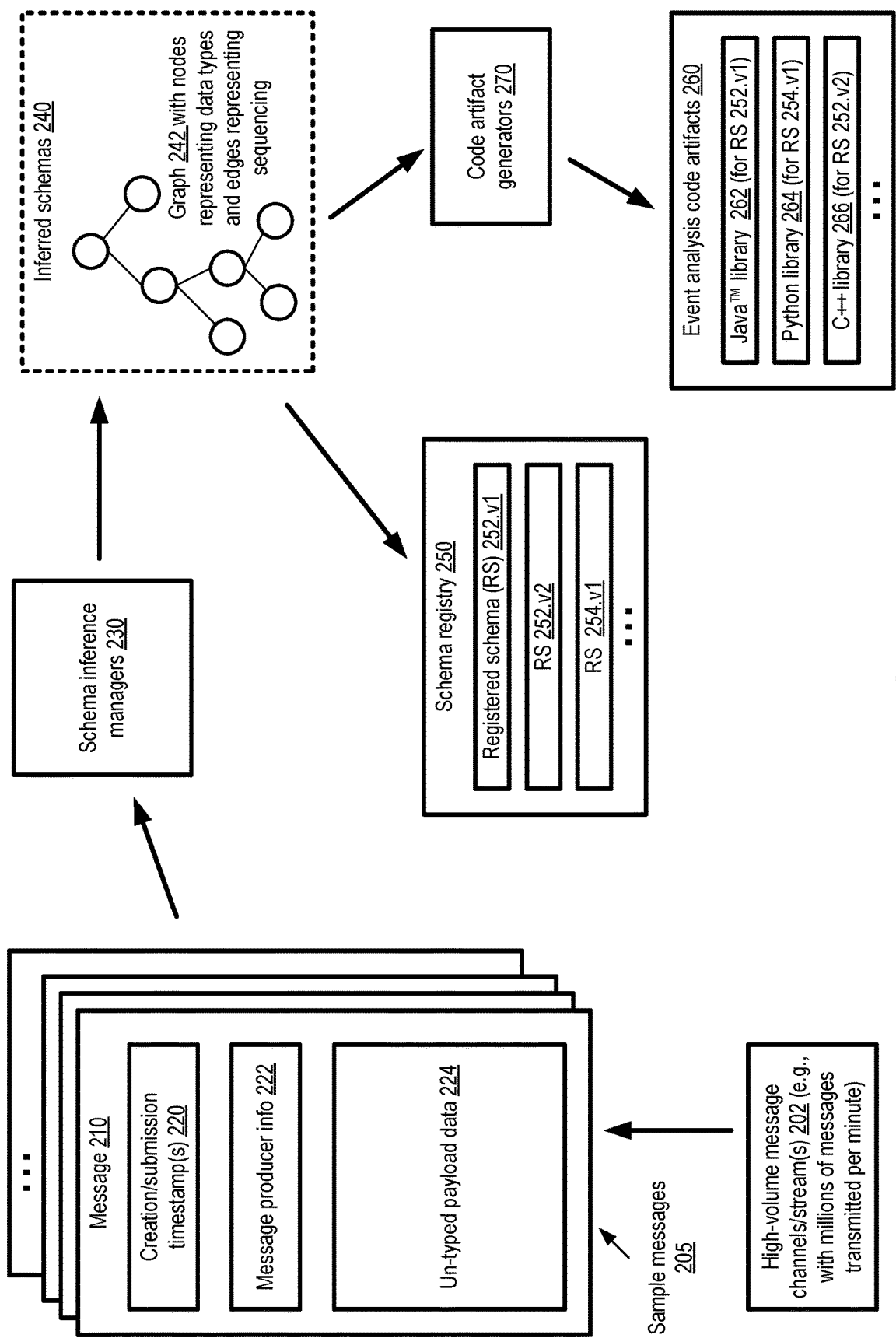
FIG. 2 illustrates a workflow for inferring schemas, registering schemas and generating code artifacts to streamline analysis of messages published to high-volume communication channels, according to at least some embodiments.

FIG. 2 illustrates a workflow for inferring schemas, registering schemas and generating code artifacts to streamline analysis of messages published to high-volume communication channels, according to at least some embodiments. In the depicted embodiment, schema inference may be performed for un-typed messages being transmitted at very high rates (e.g., millions of messages per minute or per second) over one or more high-volume channels/streams 202 by numerous message sources or producers. From the high-volume channels/streams a subset 205 of messages may be sampled, e.g., based on a sampling rule or criterion determined at a message schema management service (MSMS) similar in features and functionality to MSMS 110 of FIG. 1. Individual ones of the messages 210 may comprise one or more metadata elements in the depicted embodiment, including for example a message creation or message submission timestamp 220, as well as information 222 identifying the message producer. In addition, each message may comprise respective un-typed payload data 224, e.g., comprising text formatted in JSON (JavaScript Object Notation), XML (Extended Markup Language), HTTP/s (Hyper-Text Transfer Protocol), plain or encrypted text, a custom language supported by the channel/stream 202, or a language/format indicated in a message bus specification. In some embodiments, message producers (or the communication channel) may add metadata indicating a high-level message category to at least some messages 210. In at least one embodiment, as indicated in FIG. 1, a set of resources of the MSMS may be dedicated to extracting/capturing sample messages 205 from the channels 202 in a non-destructive manner. In other embodiments, at least some of the sampled messages may be deleted/removed from the channels 202—e.g., if a message producer informs the MSMS via a programmatic interface that a million disposable or "fake" examples of a message category are going to be transmitted on a channel, the examples may be removed from the channel by the MSMS.

One or more schema inference managers 230 of the MSMS may analyze the contents of the sample messages 205, e.g., using any of a variety of inference algorithms, and generate one or more inferred schemas 240 based on the analysis in the depicted embodiment. In some embodiments, a given inferred schema 240 may comprise a graph 242 with a plurality of nodes representing instances of respective data types or object types, and a plurality of edges representing sequencing among instances of the data types or object types. In other embodiments, a graph may not necessarily be used to represent a schema; instead, other types of conceptual models and/or corresponding data structures may be used for schemas.

Inferred schemas may be stored within a schema registry 250 in the depicted embodiment. In at least some embodiments, a given inferred schema may not necessarily remain unchanged—instead, as more messages that belong to the same category but vary in their data payload structure are analyzed, new versions of a schema may be generated and registered. As shown, for example, registry 250 may comprise two versions of a registered schema (RS) 252 (252.v1 and 252.v2), and one version of another registered schema RS 254 (254.v1). The registry 250 may provide programmatic interfaces and mechanisms for efficient searches or lookups in various embodiments.

In addition to being stored in searchable registries, the inferred schemas 240 may also be used to generate code artifacts that can be used by message consumers to automate tasks such as parsing/validation of message contents in at least some embodiments. Thus, for example, one or more code artifact generators of MSMS may generate event analysis code artifacts 260 for various versions of the registered schemas, and provide the artifacts to MSMS clients on request. As shown, example code artifacts for the set of registered schemas shown in FIG. 2 may include a Java™ library for messages corresponding to RS 252.$v1$, a Python library 264 for messages corresponding to RS 254.$v1$, and a C++ library for messages corresponding to RS 252.$v2$. In at least one embodiment, a schema may not necessarily be registered for an MSMS client to obtain code artifacts for it. For example, an MSMS client may submit an artifact request that includes a representation of a target (unregistered) message schema, a target programming language or development environment, and a desired set of artifact functionality (e.g., converting message data payloads into Java' objects), and one or more code artifact(s) that implement the desired set of functionality for the supplied unregistered schema, in the target programming language or compatible with the development environment may be generated and provided by the MSMS.

Example Heterogeneous Event Message Source Service Environment

Figure 3:
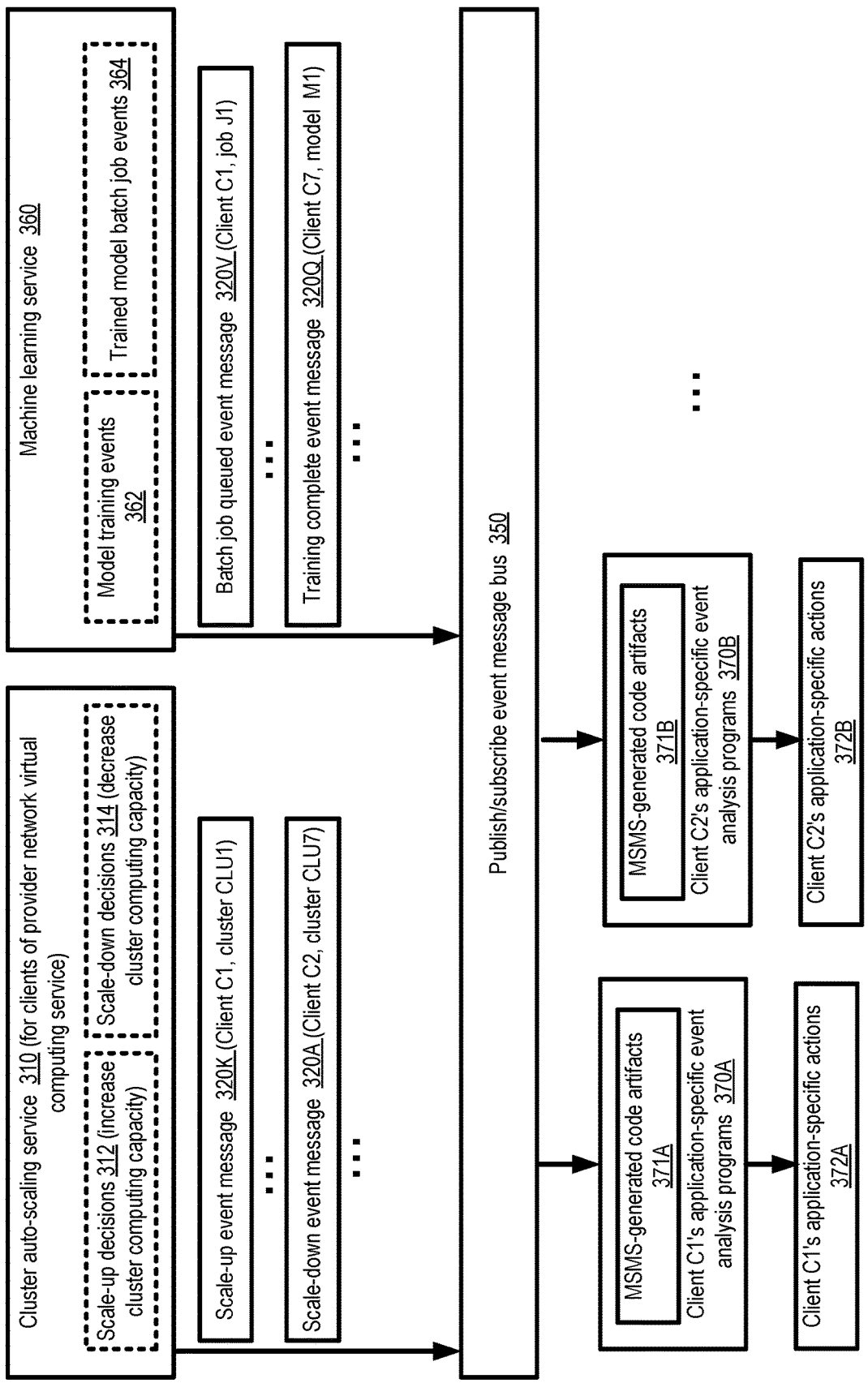
FIG. 3 illustrates an example scenario in which messages generated by a plurality of network-accessible services may be analyzed with the help of code artifacts generated at a message schema management service, according to at least some embodiments.

FIG. 3 illustrates an example scenario in which messages generated by a plurality of network-accessible services may be analyzed with the help of code artifacts generated at a message schema management service, according to at least some embodiments. In the depicted embodiment, a publish/subscribe event message bus 350 may be implemented, e.g., as one of the network-accessible services implemented at a cloud computing environment or provider network. The provider network may include a plurality of other network-accessible services, including for example a cluster auto-scaling service 310 and a machine learning service 360. The provider network may publicize a bus specification for message bus 350 in some embodiments, indicating the types of message formats that are supported for messages sent to and read from the bus.

The cluster auto-scaling service 310 may be used, for example, by clients of a virtual computing service to dynamically re-size clusters of compute resources based on workload measurements or other metrics, without requiring explicit approval for each individual re-sizing decision from the clients. For example, the auto-scaling service 310 may make scale-up decisions 312 (in which computing capacity allocated for a given cluster is increased) and/or scale-down decisions 314 (in which computing capacity allocated for a given cluster is decreased) for various clients' compute clusters. To indicate that a decision 312 or 314 has been made on behalf of a client, a respective un-typed message (e.g., with a data payload in a version of JSON, XML, HTTP, plain text or encrypted text) may be submitted to the bus 350 by the auto-scaling service in the depicted embodiment. For example, message 320A may indicate that for cluster CLU7 of a client C2, a scale-down event has been performed or initiated, while message 320K may indicate a scale-up event has been performed or initiated with respect to cluster CLU1 of client C1. Additional details of the scale-up and scale-down events may be included in the messages as well, e.g., indicating the specifics of the changed resource allocations, the reasons for the changes, and so on.

The machine learning service 360 may be used by clients to train various types of machine learning models and then to execute the trained versions of the models in the depicted embodiment. Model training events 362 may include the start of a set of iterations or epochs of the training of a model, the completion individual iterations, or the completion of the training. Submissions/completions of batch jobs to execute trained versions of the models may represent other categories of events 364 at the machine learning service. For various events, the machine learning service 360 may submit respective un-typed messages to the bus 350. For example, message 320V may indicate that a batch job J1 of a client C1 has been queued, while message 320Q may indicate that training of model M1 on behalf of client C7 has been completed.

In the depicted example scenario, various clients on whose behalf operations are being performed at the cluster auto-scaling service 310 and/or the machine learning service 360 may request that schemas be inferred for the messages generated at the services. An MSMS may generate respective inferred schemas corresponding to the different types of messages shown by way of example in FIG. 3—e.g., one schema may be generated for scale-up event messages, another for scale-down event messages, another for batch job queued event messages, and another for training complete event messages. Furthermore, in the depicted embodiment, the MSMS may provide respective sets of code artifacts, generated automatically in accordance with the inferred schemas, to the clients. For example, a set of MSMS-generated code artifacts 371A may be provided to client C1, and incorporated within client C1's application-specific event analysis programs 370A. Similarly, another set of MSMS-generated code artifacts 371B may be provided to client C2, and incorporated within client C2's application-specific event analysis programs 370B. The code artifacts may automate tedious and sometimes error-prone tasks that may otherwise have had to be performed within the analysis programs 370 (e.g., 370A or 370B) in different embodiments, such as parsing the messages 320, checking the messages for correctness and consistency, converting the message payloads into objects in various programming languages. Using the code artifacts 371 (e.g., 371A or 371B), various clients such as C1 and C2 may be able to initiate application-specific actions (e.g., actions 372A in the case of client C1, and actions 372B in the case of client C2) in response to events indicated in the messages 320 in the depicted embodiment. Depending on the application, a wide variety of actions 372 may be initiated in different embodiments—e.g., notifications regarding anticipated increases in billing accounts resulting from scale-up decisions 312 may be generated, or the results of a completed long-lasting machine learning job may be transmitted to one or more destinations.

Example Programmatic Interactions

Figure 4:
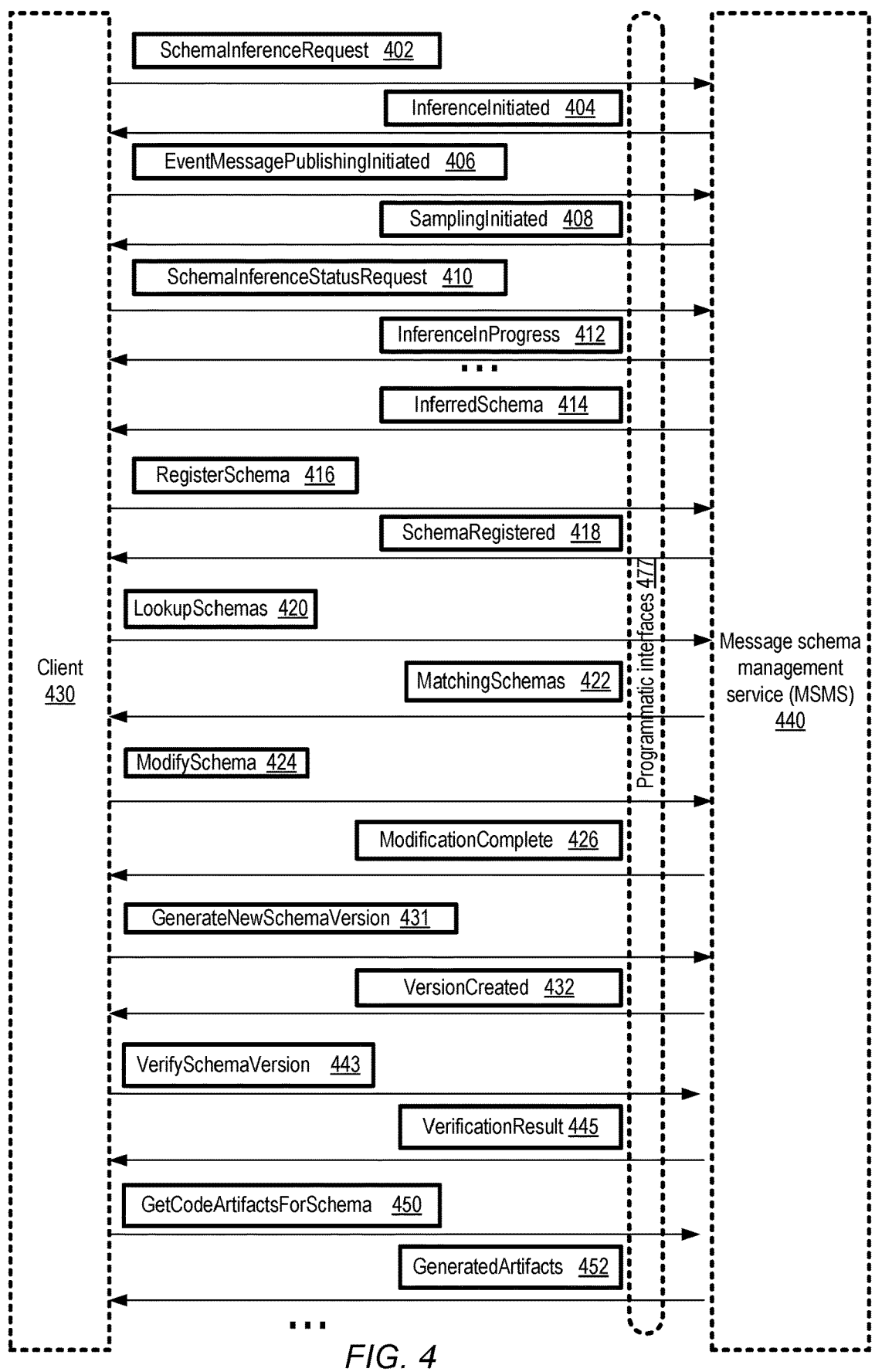
FIG. 4 illustrates example programmatic interactions between clients and a message schema management service, according to at least some embodiments.

FIG. 4 illustrates example programmatic interactions between clients and a message schema management service, according to at least some embodiments. In the depicted embodiment, a message schema management service (MSMS) 440, similar in features and functionality to MSMS 110 of FIG. 1, may implement a set of programmatic interfaces 477, such as APIs, command line tools, graphical user interfaces, web-based consoles or the like. A client 430 of the MSMS 440 may submit a SchemaInferenceRequest 402 via programmatic interfaces 177 to MSMS 440, requesting that one or more schemas be inferred or generated for a set of un-typed messages on a specified set of one or more communication channels. Parameters of request 402 may for example, include an identification of the communication channel(s), credentials that can be used to read messages from the channels, rules or criteria to be used to distinguish messages of interest to the client (for which schemas are to be inferred, versus other messages for which schemas need not be inferred), a particular inference mechanism or algorithm to be used, and so on. In response, a control plane component of the MSMS 440 may designate resources to be used to capture messages on which inference is to be performed and/or run one or more inference algorithms. An InferenceInitiated message 404 may be sent to the client in some embodiments to indicate that the workflow for schema inference has been initiated at the MSMS. Note that at least in some embodiments, it may take some time for sample messages to be captured and schemas to be inferred, so sending a synchronous message indicating that schema inference has been completed at the MSMS in response to a request 402 may not be practical.

In some embodiments, an EventMessagePublishingInitiated message 406 may be transmitted to the MSMS 440 by a client 430, notifying the MSMS that transmission of a set of messages for which one or more schemas are to be inferred has begun. In effect, message 406 may represent a message sample submission notification, indicating to the MSMS that it may begin collecting examples or samples of messages for which a schema is to be inferred. Message 406 parameters may include, for example, an identification of the communication channels being used for the messages, credentials to access the channels, rules to identify messages of interest, whether the messages should be removed/deleted after extraction from the channel, and so on. In response, the MSMS 440 may start capturing or sampling messages from a specified channel or channels, and transmit a SamplingInitiated message 408 to the client in some embodiments. Note that in some embodiments, a separate EventMessagePublishingInitiated message may not be required, e.g., if a SchemaInferenceRequest 402 has already indicated that messages for which schemas as to be inferred are being sent on a specified channel.

In some embodiments, after schema inference has begun on behalf of a client 430 but has not yet been completed for one or more message categories, the client may submit a SchemaInferenceStatusRequest 410 to the MSMS 440 via programmatic interfaces 477, requesting notification of the status with respect to a requested inference workflow. In response the MSMS may provide messages of at least two kinds in the depicted embodiment. An InferenceInProgress message 412 indicating that the work involved in schema inference has not yet been completed (and in some cases comprising a progress indicator indicating an estimated fraction of the work that has been completed, such as a "inference 75% complete" message) may be sent to the client 430, for example, or an InferredSchema message 414 message may be sent to indicate that schema inference has been completed for a category of messages indicated in the status request 410.

According to some embodiments, a RegisterSchema request 416 may be transmitted by a client 430, indicating that a specified schema (e.g., one whose name or other identification was provided in an InferredSchema message 414) should be included in a registry of the MSMS 440. In response, the MSMS 440 may store a representation of the schema and associated metadata (e.g., the client on whose behalf the schema was created, message producers whose messages were analyzed to create the schema, when the schema was created or last modified, an indication of the count or type of messages analyzed to infer the schema, the inference algorithm used, and so on) in a persistent repository in various embodiments, and transmit a SchemaRegistered message 418 back to the client. In at least one embodiment, a client may submit a request to register a schema that was generated by the client, i.e., a schema that was not inferred by the MSMS; such schemas may also be incorporated into the registry and used, along with inferred schemas, for generating code artifacts etc. In some embodiments, a client may indicate a user-defined or user-friendly name to be used to register a schema, and such a name may be included in the metadata. Note that as mentioned earlier, in some embodiments, schemas that have been inferred at the MSMS may be registered automatically, so RegisterSchema requests 416 may not be required in such embodiments. In at least one embodiment, an MSMS client may send a RegisterSchema request for a schema that was not inferred at the MSMS 440—e.g., if the client wants the MSMS to register a schema developed/designed by the client, or to register a version of a schema that diverges from an inferred schema in one or more properties. In response, one or more externally-generated schemas may be stored in the MSMS registry in such embodiments.

A LookupSchemas request 420 may be submitted by a client 430 in some embodiments, indicating one or more search criteria or query predicates to be used to identify schemas stored in the MSMS registry. In response, the MSMS 440 may attempt to find registered schemas that satisfy the search criteria or query predicates, and a MatchingSchemas message 422 indicating zero or more schemas that satisfy the search criteria or query predicates may be sent to the client 430. A wide variety of attributes or properties may be used to look up matching schemas on behalf of in different embodiments, including for example schema names, identities of the clients on whose behalf the schema was inferred or registered, identities of the message producers with respect to whose messages the schema was created/stored, one or more data types or object types included in the schema, sequencing information of included data/object types, timestamps associated with messages used to infer the schema, schema version numbers, and so on. In at least some embodiments, a LookupSchema request 420 may include or indicate one or more examples of a message category for which a matching registered schema is to be identified.

According to at least some embodiments, a client may submit a ModifySchema message 424 indicating one or more changes to be applied to an existing registered schema. The changes may apply to the data types indicated in the schema, and/or to metadata associated with the schema (e.g., the identity of the schema "owner", the client on whose behalf the schema is stored, may be changed in the metadata) in various embodiments. A new version of the schema may be created with the requested modifications, or the existing schema may simply be replaced by a modified version, and a ModificationComplete message 426 may be sent back to the client in some embodiments. Note that in order to ensure that code artifacts that have already been generated and propagated continue to work, in some embodiments existing schemas may not be overwritten in place—instead, new versions of the schemas (and corresponding versions of code artifacts) may be stored in the MSMS registry. In some embodiments, one or more new versions of a registered schema may be generated automatically at an MSMS 440, e.g., in response to detected changes in the data types or sequences of data types within messages transmitted to communication channels. For example, consider a scenario in which a message schema version MSV1 does not include an instance of an object type OT1. Consider further that some number of messages that appear to be (based on almost completely matching the data types of MSV1) examples or instances of MSV1 are detected at the MSMS, but such messages also containing an instance of type OT1. Then, in some embodiments, the MSMS may automatically generate a new version of the schema (e.g., MSV2) which incorporates the additional object type OT1, and save/register the new version. In at least one embodiment in which such automated versions are generated, the MSMS may attempt to notify message producers and/or message consumers regarding the new version before registering the new version, and/or obtain approvals via programmatic interfaces for the new version.

A GenerateNewSchemaVersion message 431 may be sent to the MSMS to explicitly request the creation or branching of a new version of an existing schema in some embodiments, e.g., instead of a Modify Schema message. The new version, incorporating changes indicated in the message 431 may be stored in the MSMS registry, and a VersionCreated message 432 may be sent to the client in response. According to some embodiments, a client may submit a VerifySchemaVersion request 443 to the MSMS 440, indicating one or more messages whose schema versions are to be verified. For example, consider a scenario in which five different versions V0-V4 of a given schema representing a category of messages are registered at the MSMS over time, and individual messages of the category are expected to indicate their version numbers (e.g., using a "<Versionnumber>" element included in the metadata portion or header of the message). A given stream of messages obtained at a message consumer client of the MSMS may comprise examples of several of the versions. The client may submit a VerifySchemaVersion request to determine whether the claimed version number (e.g., V2) indicated in a particular message is accurate (and if not, whether that message complies with any of the registered versions). In a VerificationResult response 445, generated in response to such a request, the MSMS may provide an indication of whether the message is or is not compliant with the claimed version (and/or any of the other related versions) in various embodiments.

According to at least some embodiments, a GetCodeArtifactsForSchema request 450 may be submitted via programmatic interfaces 477, requesting code artifacts be provided to the requesting client. Parameters of such a request 450 may include for example an identifier of the schema for which artifacts are to be provided, the target programming language(s), the target integrated development environments (IDEs), the desired functionality to be implemented by the code artifacts, and so on. In some embodiments, as soon as a schema is registered at the MSMS, corresponding code artifacts implementing some common event processing tasks such as parsing/validating event messages, generating serializable objects in one or more frequently-used programming languages, and so on may be automatically generated, and such artifacts may be provided to a client in a GeneratedArtifacts message 452 if they meet the criteria indicated in the request 450. In some cases, new code artifacts may be generated in response to a request 450 (if the requested kinds of artifacts have not been generated in advance) and supplied in the response message 452. In at least some embodiments in which numerous versions of a schema may potentially be registered at an MSMS, the associated code artifacts produced by the MSMS may include code to determine whether a particular message complies with any of the registered versions and to perform a version-dependent analysis of messages. For example, as messages corresponding to several different respective versions are processed at the code artifact, the artifact may be able identify the specific versions to which each of the messages correspond, and extract instances of the appropriate data types from each message based on its identified schema version. Note that in some embodiments, other combinations of message schemarelated programmatic interactions than those shown in FIG. 4 may be supported.

Example Message Channels and Formats

Figure 5:
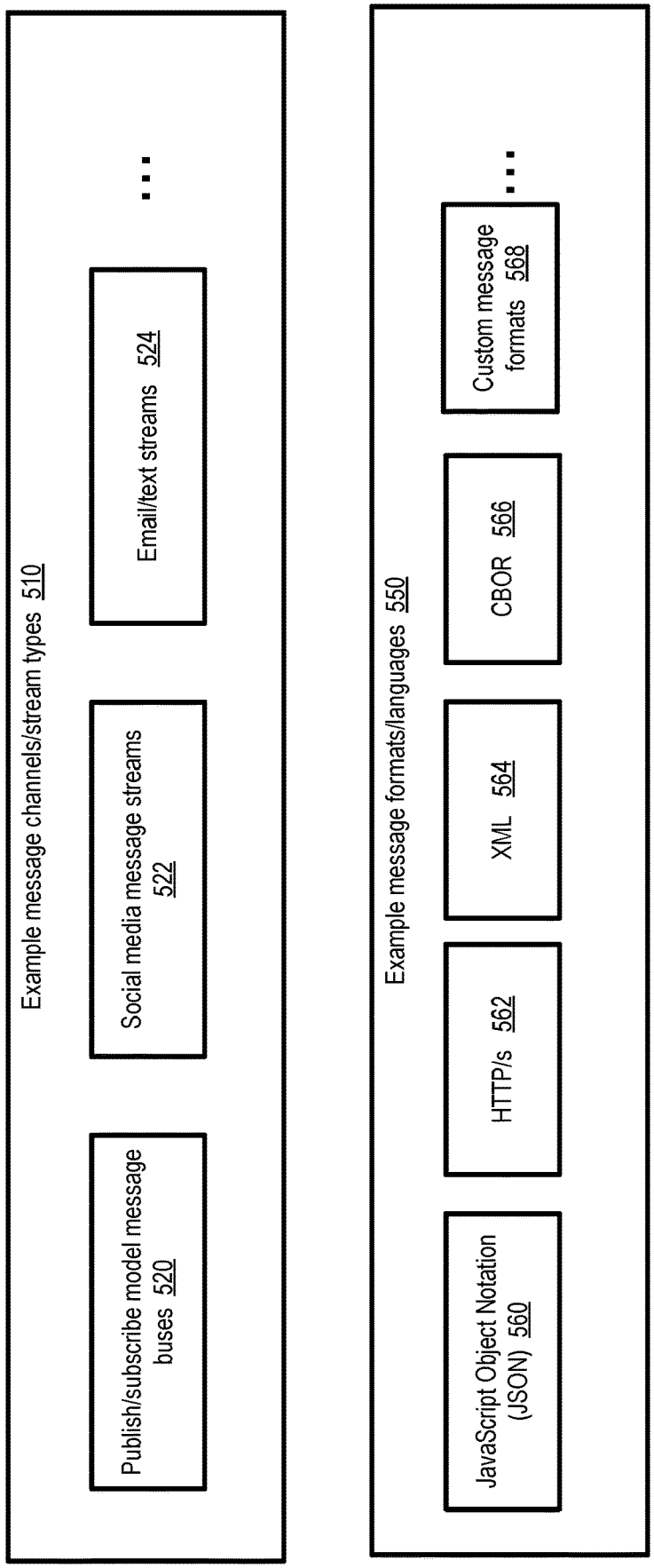
FIG. 5 illustrates example message channel types and message formats for which corresponding schemas may be inferred and stored at a message schema management service, according to at least some embodiments.

FIG. 5 illustrates example message channel types and message formats for which corresponding schemas may be inferred and stored at a message schema management service, according to at least some embodiments. As shown, the supported channel types 510 of an MSMS similar in functionality and features to MSMS 110 of FIG. 1 may include message buses 520 that implement a publish/subscribe model (e.g., similar to bus 350 shown in FIG. 3 and implemented at a provider network service), social media message streams 522 (e.g. posts to a social media platform by its users), email or text (Short Message Service or SMS) streams 524, and the like in different embodiments. In a publish/subscribe model, message producers and consumers may obtain respective sets of permissions to write messages to a channel (e.g., via a publish, write or "put" API) and/or read messages from a channel (e.g., via a read or "get" API), e.g., at least somewhat independently of the times at which the messages were written or published. Note that a given client or user of a publish/subscribe channel may in some embodiments produce messages and also consume messages from the same channel. Message producers and consumers may belong to different business entities or organizations in some embodiments in which cross-organizational applications are implemented. In various ones of the channels whose messages are analyzed at an MSMS to generate and register schemas as well as code artifacts of the kind discussed earlier, consent to access and analyze the messages may be obtained from the message producers and/or message consumers.

Any of a variety of formats/languages 550 may be used for the data contained in the un-typed messages and analyzed at an MSMS similar to MSMS 110 of FIG. 1 in different embodiments. In some cases, messages may be expressed in JSON 560, for example. In other cases, the messages may use HTTP or HTTPs 562, XML 564, CBOR (Concise Binary Object Representation) 566, or a custom message format 568 supported by an operator/owner of the communication channel(s) being used. In some embodiments, the data payloads of at least some messages may be encrypted, and the MSMS may be provided with tools or keys (e.g., by the message producers or consumers) that can be used to decrypt such messages.

Example Baseline Schemas and Derived Object Schemas

Figure 6:
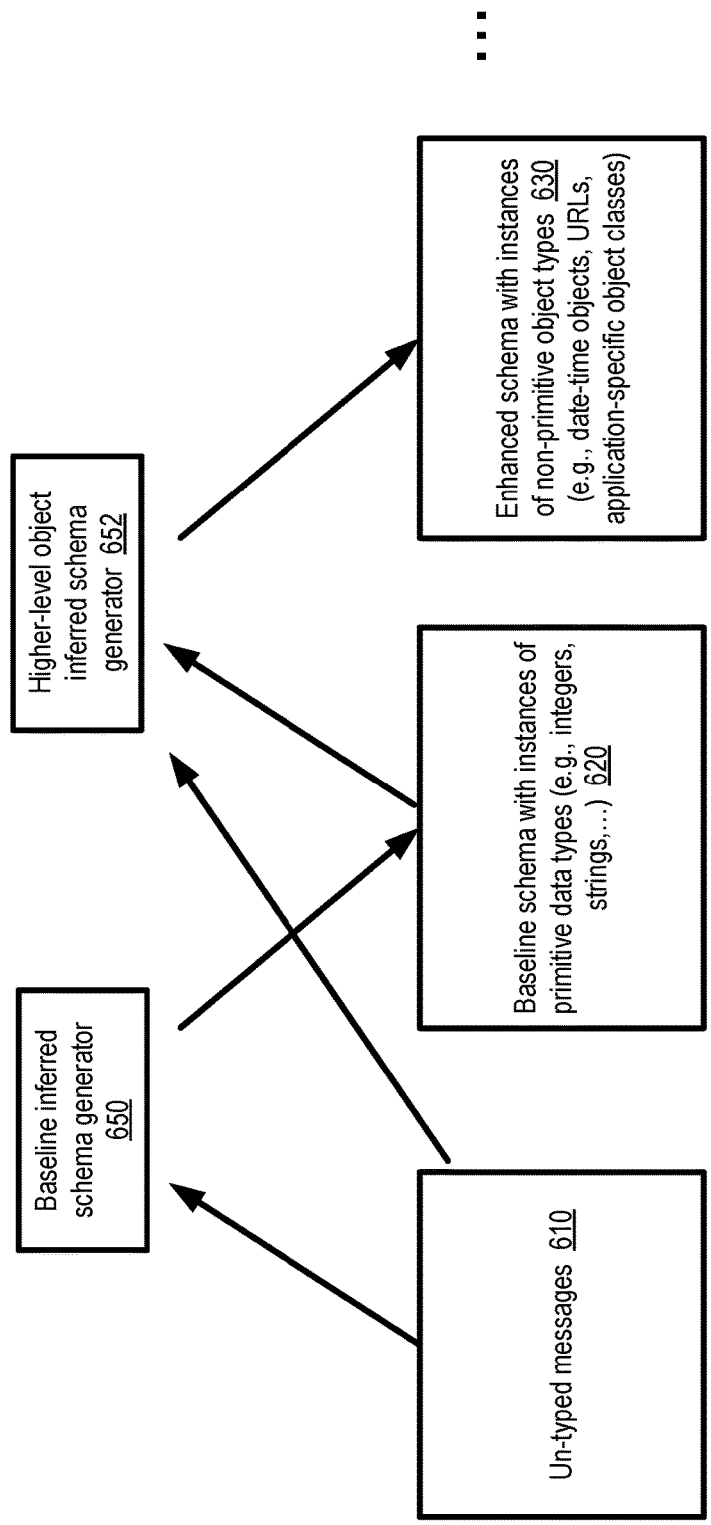
FIG. 6 illustrates an example scenario in which baseline inferred schemas as well as derived object inferred schemas may be generated, according to at least some embodiments.

For some types of event processing applications, schemas which indicate derived data types, instead of or in addition to primitive types such as integers, strings and the like may be useful. FIG. 6 illustrates an example scenario in which baseline inferred schemas as well as derived object inferred schemas may be generated, according to at least some embodiments.

A baseline inferred schema generator 650 implemented for example at one or more computing devices of an MSMS similar to MSMS 110 of FIG. 1 may first generate a baseline schema 620 based on analysis of a set of un-typed messages 610 captured from one or more communication channels in the depicted embodiment. The baseline schema 620 may comprise instances of primitive data types, which may be determined by lexical analysis of the message data and comparisons of the proposed schema graphs corresponding to numerous ones of the messages, followed by merging or fusion of the proposed schemas in some embodiments as mentioned earlier.

One or more higher-level object inferred schema generators 652, also implemented at one or more computing devices of the MSMS in the depicted embodiment, may take semantic information indicated in the contents of sampled messages, and/or semantic information indicated programmatically by a client in a schema inference request, into account, and transform some of the primitive data types of the baseline schemas into higher-level or derived objects. For example, if, within a particular portion of numerous messages 610, a string that can be interpreted as a time of day or a data appears, a date-time object type may be used instead of a more generic string in an enhanced schema 630 which comprises at least some non-primitive data types. Similarly, if a string beginning with the text "http" or "https" appears in similar relative positions within numerous ones of the messages 610, a "URI" or "URL" data type may be included in the enhanced schema 630. In some embodiments, a client of an MSMS may provide hints programmatically to the MSMS, indicating application-specific object types or classes, instances of which may be detected within message data by pattern matching, regular expression analysis and so on, and such object types may be incorporated into the schemas and code artifacts generated at the MSMS. Note that at least in some embodiments, schemas with such higher-level derived objects may not be generated or used.

Example Handling of Malformed Messages

Figure 7:
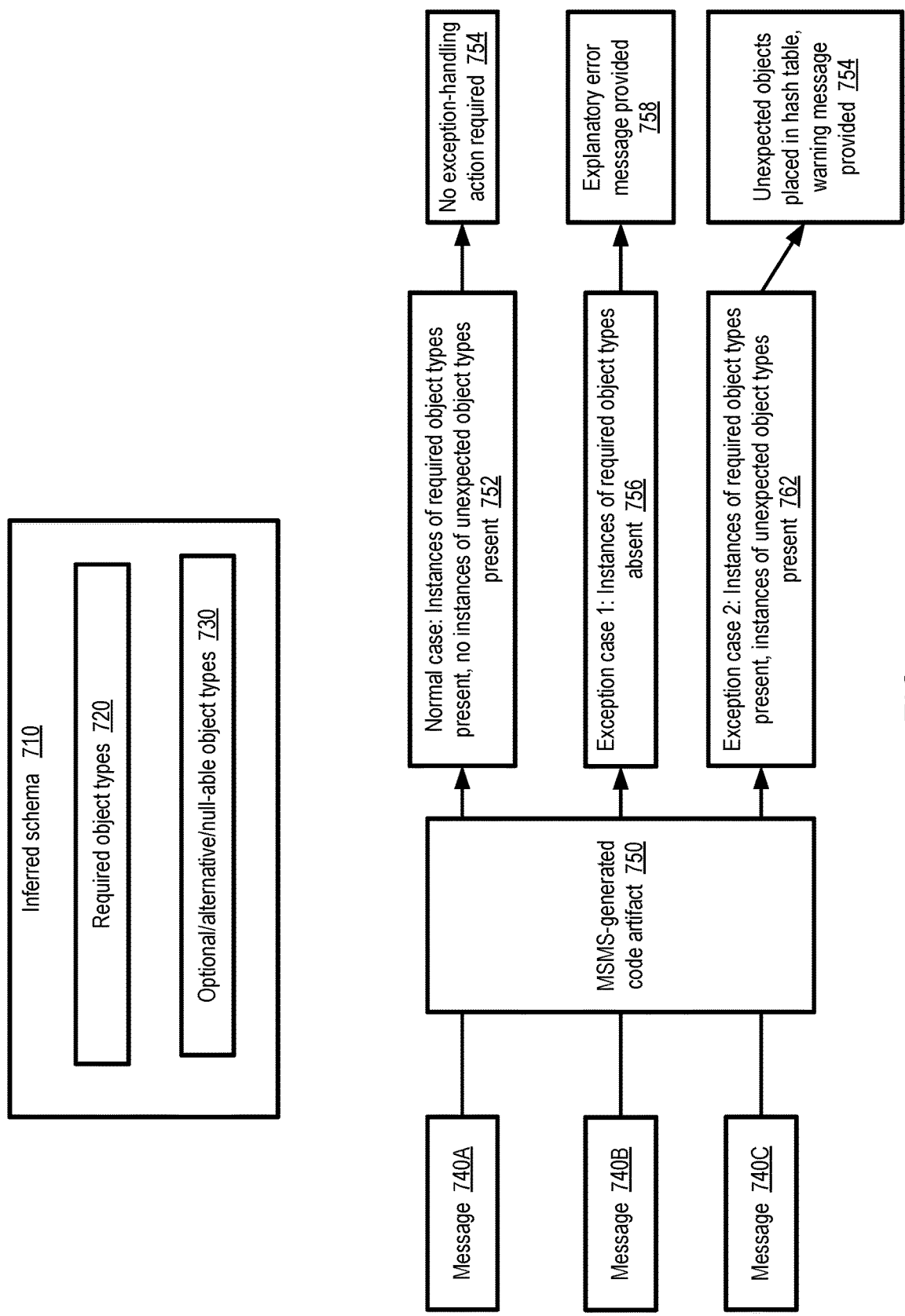
FIG. 7 illustrates an example scenario in which code artifacts generated at a message schema management service may implement techniques to handle malformed messages, according to at least some embodiments.

After a schema has been registered for messages of a particular category, it may sometimes be the case that some subsequent messages that would be expected to contain instances of data types indicated in the schema do not in fact contain such instances. Messages that do not satisfy constraints defined in registered schemas, either by not including instances of required data types, or by including instances of data types that are not included in the schema, may be referred to as malformed or non-conforming messages. FIG. 7 illustrates an example scenario in which code artifacts generated at a message schema management service may implement techniques to handle malformed messages, according to at least some embodiments.

In the depicted embodiment, an inferred schema 710 for a category of messages may comprise instances of two types of object types. Object types may include primitive data types (e.g., character, string, integer, etc.), as well as types derived from primitive data types (e.g., date, URL/URI, application-specific classes etc.) in various embodiments. Respective instances of one or more required object types 720 may be considered mandatory for a message to be considered valid according to the schema 710. In contrast, other object types 730 of the schema may not be mandatory. For example, in a particular portion of a message, either a character string or an integer may be acceptable, so the (string, integer) data type combination may be referred to as an alternative data type combination. The absence of instances of one or more object types may be acceptable, and such data types may be referred to as optional or null-able data types in the depicted embodiment. Other object types that are not indicated in the schema may be referred to as unexpected object types.

When a message 740, such as 740A, 740B or 740C is processed at an MSMS-generated code artifact 750 in accordance with the inferred schema 710, actions to handle scenarios in which instances of required object types are missing, or scenarios in which instances of object types that are not mentioned in the schema 710 at all, may be taken in the depicted embodiment. Such scenarios may be termed exception scenarios, and the corresponding actions may be termed exception-handling actions in some embodiments.

In the normal-behavior case 752, as with message 740A, all expected instances of required object types 720 may be present, and no instances of unexpected object types may be present in the message. As a result, no exception handling action may be required, as indicated in block 754. In a first type of exception scenario 756, one or more instances of required object types may be absent in a message such as 740B. In the depicted embodiment, the code artifact 750 may provide an explanatory error message 758, such as "Invalid message: missing required data of type <object type>". In a second type of exception scenario 762, instances of required object types may be present in a message such as 740C, but one or more instances of unexpected object types may also be present. In such a scenario, the code artifact may for example perform an exception handling action 754 similar to the following in the depicted embodiment: the instances of the unexpected data types may be placed or stored in a data structure such as a hash table included within a programming language object generated from the message 740C, and a warning message such as "Unexpected object of type <object type> found in message—see hash table" may be generated. By placing the unexpected data in a hash table instead of simply discarding it or rejecting the message 740C as invalid, and by providing a notification that the extra/unexpected data has been stored in the hash table, the information contained in the unexpected data may be retained (at least temporarily) instead of being lost (potentially permanently).Such retained extra message data may be used for debugging or other purposes such as requesting registration of new schema versions in some embodiments. In various embodiments, the code artifacts 750 generated at the MSMS may thus include code to present, to a message consumer (and/or to other entities), an indication of an error encountered during analysis of a message which (a) meets one or more criteria for inclusion in the a category defined by a schema version and (b) does not satisfy one or more elements of the schema version.

Example Provider Network Environment

Figure 8:
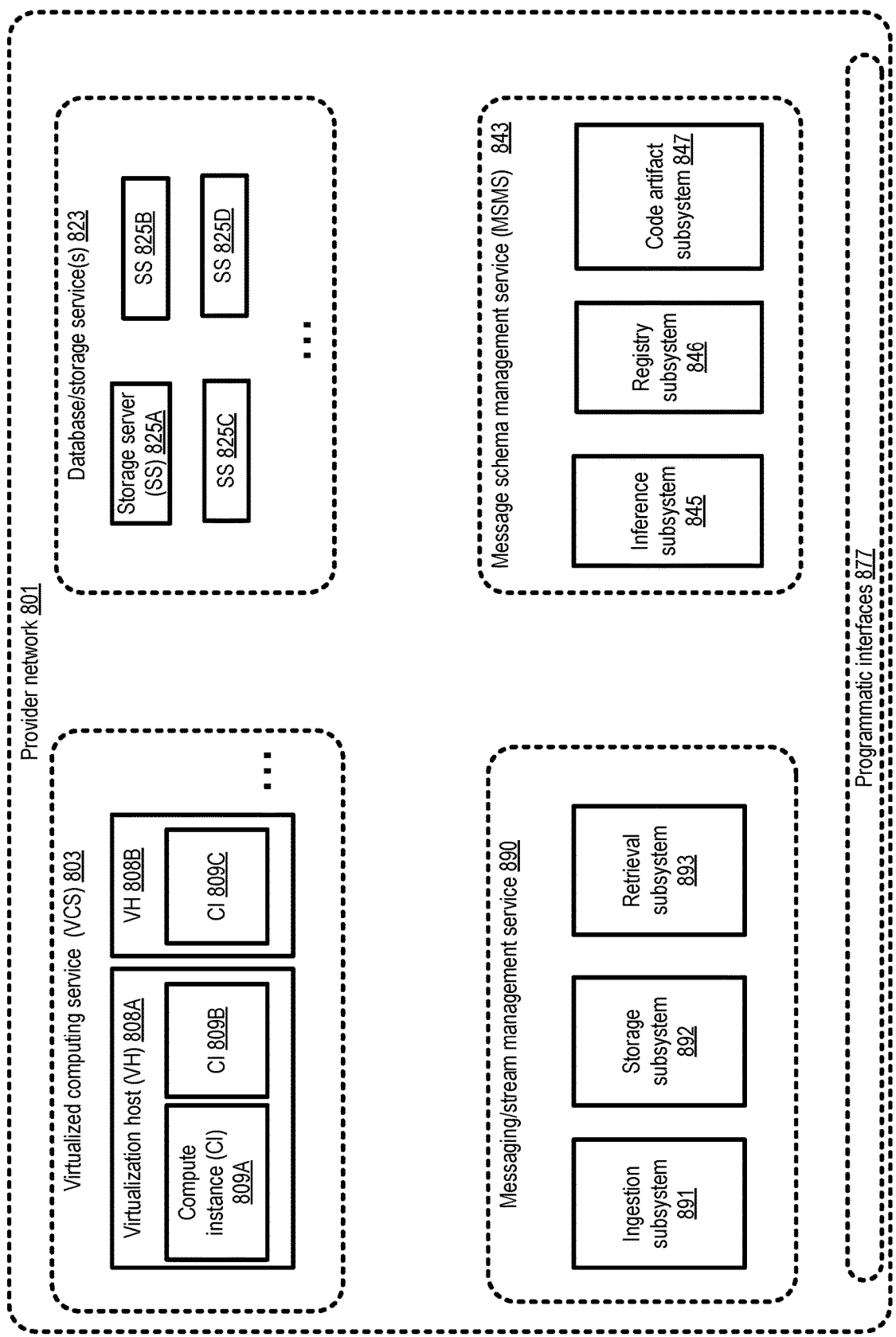
FIG. 8 illustrates an example provider network environment in which a message schema management service may be implemented, according to at least some embodiments.

In some embodiments a message schema management service may be implemented as part of a provider network. FIG. 8 illustrates an example provider network environment in which a message schema management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a virtualized computing service (VCS) 803, a database/storage service 823, one or more messaging or data stream management services 890, as well as message schema management service 843. Each of the services may include a respective set of computing devices and/or other resources in some embodiments. Components of a given service may utilize components of other services in the depicted embodiment—e.g., compute instances (CIs) 809A, 809B or 809C, implemented at virtualization hosts 808A and 808B of the virtualized computing service 803 and/or storage servers 825 (e.g., 825A-825D) of the storage service may be employed by various other services of provider network 801. Individual ones of the services shown in FIG. 8 may implement a respective set of programmatic interfaces 877 which can be used by external and/or internal clients (where the internal clients may comprise components of other services) in the depicted embodiment. In some embodiments, the message schema management service 843 may be implemented as a subsystem of a higher-level service—e.g., the MSMS 843 may be implemented as a subsystem of a messaging service 890.

The MSMS 843 (similar in functionality and features to MSMS 110 of FIG. 1) may comprise a plurality of subsystems in the depicted embodiment. An inference subsystem 845 may employ any of various schema inference algorithms to generate schemas for un-typed messages, a registry subsystem 846 may be used to store and query inferred schemas, and a code artifact generation subsystem 847 may produce code artifacts that can be used to analyze messages according to inferred schemas, for example. Computing resources used for the inference subsystem 845 and/or for the code artifact subsystem 847 may comprise compute instances 809 of the VCS in some embodiments. Storage required for the MSMS schema registry and for generated code artifacts may be acquired from the database/storage service 823 in at least one embodiment.

One or more messaging services or streaming data management services 890 may be implemented at provider network 801, and such services may be used by message producers to publish un-typed messages for which schemas may be inferred at the MSMS 843. A messaging/stream management service 890 may itself comprise an ingestion subsystem 891 (for ingesting or receiving messages), a storage subsystem 892 (for storing received messages at least temporarily) and a retrieval subsystem 893 (used by message consumers to acquire or extract messages ingested at the service) in some embodiments. Individual ones of the subsystems 891, 892 or 893 may also utilize resources from other services such as the VCS 803 or the database/storage service 823. In at least some embodiments, other services of the provider network 801 may use the messaging service 890 to publish their messages—e.g., as discussed in the context of FIG. 3, a cluster auto-scaling service and/or a machine learning service may be implemented at the provider network 801, and such services may use the messaging service to indicate various types of events.

In at least one embodiment, at least some of the techniques discussed above for schema inference, registration and schema-related code artifact generation may be accomplished without acquiring resources of network-accessible services such as those shown in FIG. 8. For example, a standalone set of tools implemented at one or more computing devices which are not part of a network-accessible service may be used in some embodiments.

Methods for Message Schema Management

Figure 9:
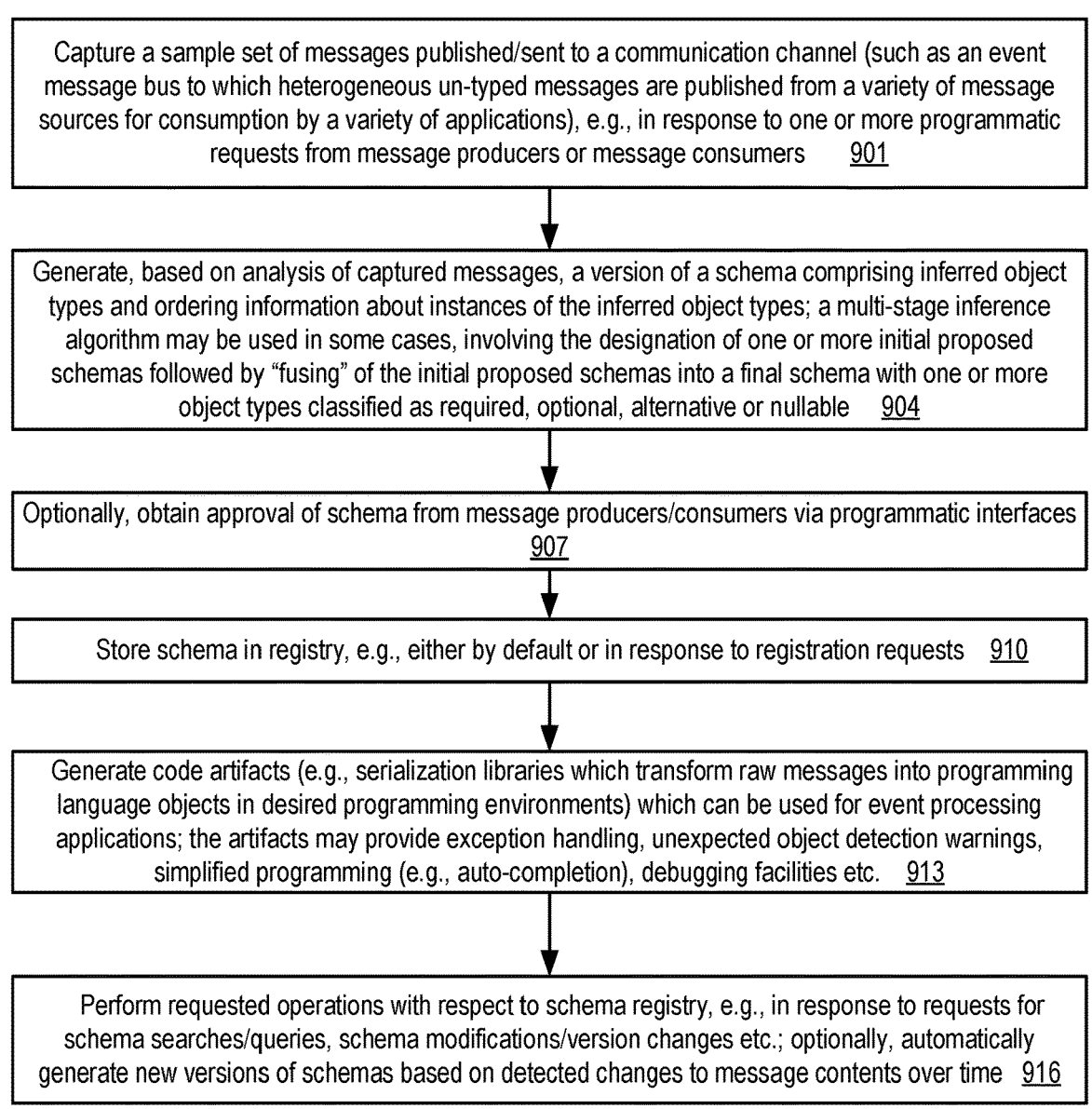
FIG. 9 is a flow diagram illustrating aspects of operations that may be performed at a message schema management service, according to at least some embodiments.

FIG. 9 is a flow diagram illustrating aspects of operations that may be performed at a message schema management service, according to at least some embodiments. As shown in element 901, a sample set of messages sent to or published via a communication channel may be obtained or captured, e.g., in response to one or more programmatic requests from clients of a message schema management service (MSMS) such as message producers or message consumers in the depicted embodiment. Individual ones of the messages, which may represent respective events, may not indicate the data types of their contents, and a schema for the messages may not be transmitted or provided by the message producers in various embodiments. A variety of different types of messages, each corresponding to one or more events detected at a message producer, may be transmitted via the communication channel in some embodiments; as such, the collection of messages sent on the communication channel may be heterogeneous rather than homogenous, with different messages of different lengths and comprising different numbers of instances of various combinations of data types or object types.

Based on an analysis of the obtained messages, a version of a schema comprising a set of inferred object types and ordering/sequencing information about the instances of the object types within messages of a given category may be generated in the depicted embodiment (element 904). Any of a variety of schema inference algorithms may be employed in different embodiments. For example, a multi-stage inference algorithm may be used in one embodiment, in which one or more initial proposed schemas are generated, each comprising a tree or graph of data types parsed from respective messages, and then the proposed schemas are modified or fused based on similarity analysis of the individual proposed schemas corresponding to the different proposed schemas to arrive at a final inferred schema. Other types of machine learning algorithms may be used for schema inference in other embodiments.

In some embodiments, the MSMS may optionally obtain approval of the inferred schema from message producers and/or consumers via programmatic interfaces (element 907). In other embodiments, obtaining such approval may not be required. A persistent representation of the inferred schema may be stored in a registry or repository in various embodiments, e.g., either by default or in response to programmatic registration requests (element 910).

According to at least some embodiments, a set of one or more code artifacts may be generated corresponding to the inferred schema version (element 913). Such code artifacts may include, for example, serialization libraries or other code modules that transform raw messages into programming language objects within desired programming environments (e.g., IDEs or the like). The auto-generated code artifacts may be used to automate various event processing tasks, including parsing and verification of message contents, in some embodiments. In various embodiments the code artifacts may provide exception handling to process malformed or non-schema-compliant messages, warnings with respect to detection of unexpected objects within messages, simplified programming (e.g., auto-completion of variable or object type names), debugging facilities and the like.

A number of other types of schema-related operations may be performed in various embodiments in response to programmatic requests (element 916). For example, clients of the MSMS may submit search requests indicating one or more search criteria, and the MSMS may provide registered schema versions that satisfy the criteria (or come close to satisfying the criteria), or modified versions of schemas may be stored at the request of the clients. In at least one embodiment, after a given version of a schema has been registered and stored in a repository, the MSMS may analyze subsequent messages that represent (or appear to represent) examples or instances of that schema. If the data types whose instances are represented in such messages change over time, such that the messages no longer match the currently-registered version(s) of the schema, the MSMS may automatically adapt to the changes by generating new versions of the schemas (which are matched by the more recent messages) in such embodiments.

It is noted that in various embodiments, some of the operations shown in FIG. FIG. 9 may be implemented in a different order than that shown in the figure, or may be performed in parallel rather than sequentially. Additionally, some of the operations shown in FIG. 9 may not be required in one or more implementations.

Use Cases

The techniques described above, of automated inference of message schemas, registration of the schemas in a searchable repository, and distribution of automatically generated code artifacts to process messages according to the inferred schemas, may be useful in a variety of scenarios. Many modern large-scale distributed systems and services are designed to be event-driven, in that operations are performed at various components of the distributed environment in response to events indicated in messages transmitted on a shared communication channel. The senders of a message may have no direct control over when or by which specific entities the messages will be processed (if the message is processed at all); often, message senders and recipients may belong to different organizations, and messages may be constructed without adherence to an agreed-upon set of rules. In environments in which high volumes of such un-typed or un-structured messages have to be processed, inferring schemas for messages, supporting queries directed to a registry of inferred schemas, and providing automatically generated libraries or other code artifacts to help process the messages may help improve the efficiency of event processing applications and reduce the likelihood of errors in event processing.

illustrative Computer System

Figure 10:
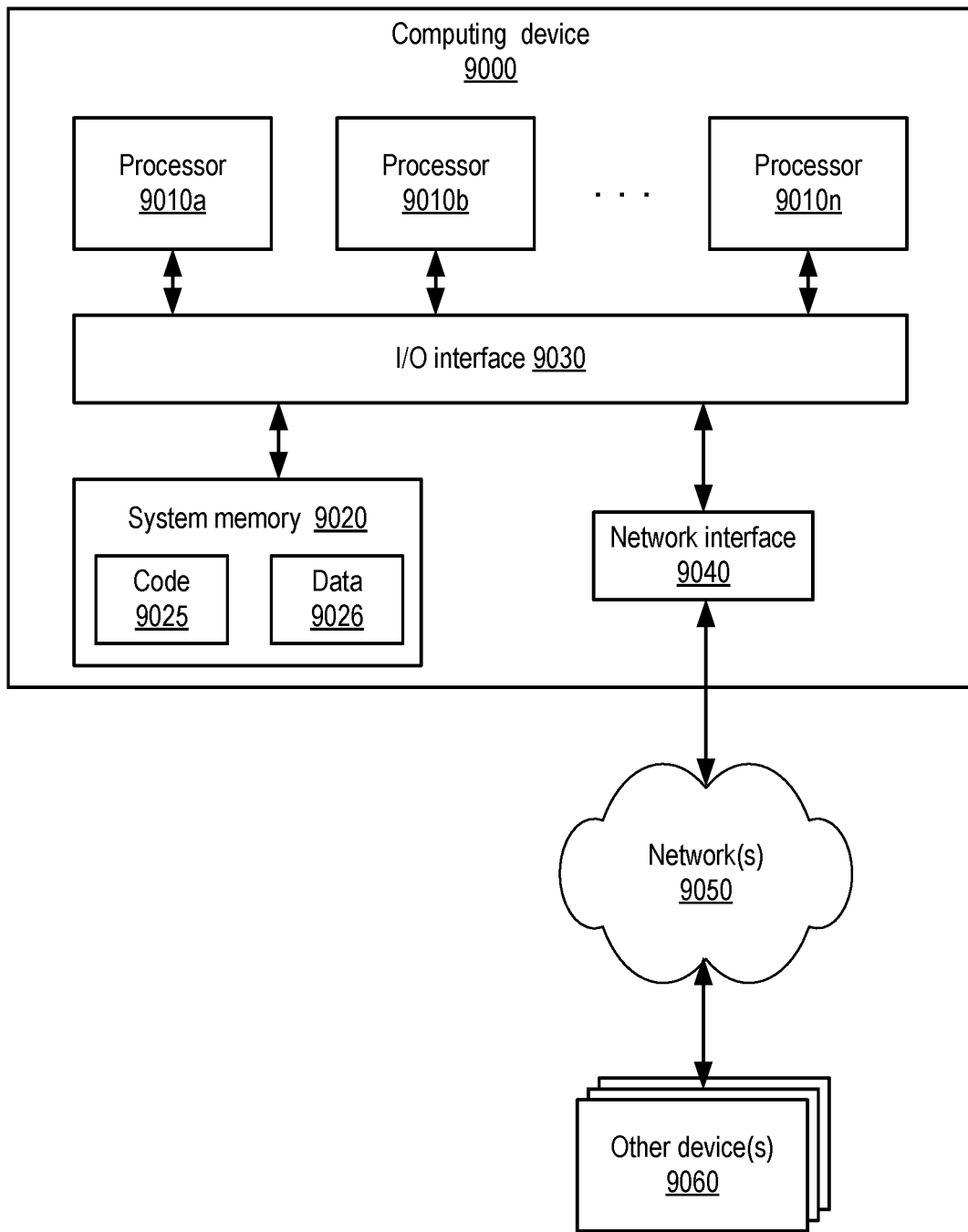
FIG. 10 is a block diagram illustrating an example computing device that may be used in at least some embodiments.

In at least some embodiments, a server that implements a portion or all of one or more of the technologies described herein, including the techniques for various elements of a message schema management service, including schema inference subsystems, message capture subsystems, schema registries, and automated code generation subsystems may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a schema management service;
wherein the one or more computing devices include instructions that upon execution on or across one or more processors cause the one or more computing devices to:
obtain a set of messages published to a communication channel by one or more message producers, wherein individual ones of the messages represent respective events, wherein individual ones of the messages do not specify object types of contents of the messages, and wherein a schema for interpreting contents of the messages is not provided to the schema management service;
generate, based at least in part on an analysis of one or more messages of the set, a first version of a first schema for a first category of messages, wherein the first version includes at least respective indications of (a) one or more inferred object types and (b) an ordering of instances of the one or more inferred object types within a message of the first category;
store, in a registry of message schemas of the communication platform, the first version of the first schema;
in response to a query received via one or more programmatic interfaces from a message consumer, provide an indication of one or more registered schemas which satisfy a criterion indicated in the query, wherein the one or more registered schemas include the first version of the first schema;
in response to an artifact request from the message consumer indicating (a) the first schema and (b) a target programming environment of the message consumer, provide one or more code artifacts generated at the schema management service in accordance with the first version of the first schema, wherein the one or more code artifacts include at least a first code artifact to automate, in the target programming environment, at least a portion of an event processing task for events indicated in messages of the first category.

2. The system as recited in claim 1, wherein the one or more computing devices include further instructions that upon execution on or across one or more processors further cause the one or more computing devices to:
in response to a schema version verification request received via the one or more programmatic interfaces, wherein the schema version verification request indicates a first message, provide an indication of whether the first message is compliant with a particular version of a schema stored in the registry.

3. The system as recited in claim 1, wherein the one or more code artifacts include code to (a) determine whether a particular message complies with the first version of the first schema or with a second version of the first schema and (b) perform a version-dependent analysis of the particular message.

4. The system as recited in claim 1, wherein the one or more computing devices include further instructions that upon execution on or across one or more processors further cause the one or more computing devices to:
detect that contents of an additional group of one or more messages published to the communication channel do not match the first version of the first schema; and
generate a second version of the first schema, such that at least the additional group matches the second version of the first schema; and
store the second version in the registry.

5. The system as recited in claim 1, wherein the one or more computing devices include further instructions that upon execution on or across one or more processors further cause the one or more computing devices to:
obtain, via the one or more programmatic interfaces, a rule to identify messages of the set.

6. A method, comprising:
performing, at one or more computing devices:
generating, based at least in part on an analysis of one or more messages transmitted to a communication channel, a first schema for a first category of messages, wherein the first schema includes at least respective indications of (a) one or more data types and (b) an ordering of instances of the one or more data types within a message of the first category;

storing, in a registry of message schemas, the first schema;

providing an indication of one or more registered schemas which satisfy a criterion indicated in a query, wherein the one or more registered schemas include the first schema;

in response to an artifact request indicating the first schema, wherein the artifact request is received via a programmatic interface, providing one or more automatically generated code artifacts, including at least a first code artifact generated in accordance with the first schema, wherein the first code artifact automates at least a portion of an event processing task for events indicated in messages of the first category.

7. The method as recited in claim 6, further comprising performing, at the one or more computing devices:

obtaining, via a programmatic interface, a message sample submission notification; and capturing, in response to the submission notification, the one or more messages from among a plurality of messages transmitted to the communication channel.

8. The method as recited in claim 6, further comprising performing, at the one or more computing devices:

obtaining, via a programmatic interface, a schema registration request, wherein the first schema is stored in the registry in response to the schema registration request.

9. The method as recited in claim 6, further comprising performing, at the one or more computing devices:

obtaining, via a programmatic interface, a schema inference request, wherein the first schema is generated in response to the schema inference request.

10. The method as recited in claim 6, wherein the criterion indicated in the query indicates one or more of: (a) identification information of at least one message producer of the one or more messages, (b) one or more data types included in the first schema, (c) a timestamp associated with the one or more messages, or (d) a schema version number.

11. The method as recited in claim 6, wherein the first code artifact includes code to present, to a message consumer, an indication of an error encountered during analysis of a message which (a) meets one or more criteria for inclusion in the first category and (b) does not satisfy one or more elements of the first schema.

12. The method as recited in claim 6, wherein the first code artifact includes code to present, to a message consumer, (a) an indication that a particular message includes one or more instances of a data type that is not included in a schema of the particular message and (b) an indication of a data structure, generated by the code artifact, from which the one or more instances of the data type can be obtained.

13. The method as recited in claim 6, wherein the first code artifact is incorporated within a first integrated development environment.

14. The method as recited in claim 6, further comprising performing, by the one or more computing devices:

obtaining an indication, via a programmatic request, of a programming language used by a consumer of messages of the communication channel, wherein the first code artifact includes at least some code in the programming language.

15. The method as recited in claim 6, wherein the first code artifact includes a serialization library.

16. One or more non-transitory computer-accessible storage media storing program instructions that when executed on or across one or more processors cause one or more computer systems to:

generate, based at least in part on an analysis of one or more messages transmitted to a communication channel, a first schema for a first category of messages, wherein the first schema includes at least respective indications of (a) one or more data types and (b) an ordering of instances of the one or more data types within a message of the first category;

store, in a registry of message schemas, the first schema; and provide one or more automatically generated code artifacts, including at least a first code artifact generated in accordance with the first schema to automate at least a portion of an event processing task for events indicated in messages of the first category.

17. The one or more non-transitory computer-accessible storage media as recited in claim 16, wherein at least one message of the one or more messages comprises one of: (a) a text message submitted from a mobile phone, (b) an e-mail, (c) a message formatted according to a version of HTTP (HyperText Transfer Protocol), (d) a message formatted according to a version of JSON (JavaScript Object Notation), (e) a message formatted according to a version of XML (Extended Markup Language) or (f) a message formatted according to a message bus specification.

18. The one or more non-transitory computer-accessible storage media as recited in claim 16, storing further program instructions that when executed on or across the one or more processors further cause one or more computer systems to:

generate an initial proposed schema comprising a first graph representation of respective primitive data types of a first plurality of tokens extracted from a first message of the one or more messages; and to generate the first schema, modify the initial proposed schema based at least in part on differences identified between the first graph representation and a second graph representation, wherein the second graph representation corresponds to respective primitive data types of a second plurality of tokens extracted from a second message of the one or more messages.

19. The one or more non-transitory computer-accessible storage media as recited in claim 16, storing further program instructions that when executed on or across the one or more processors further cause one or more computer systems to:

determine that processing of a particular message by the first code artifact requires a modification to the first code artifact; and obtain, via a programmatic interface, approval to modify the first code artifact.

20. The one or more non-transitory computer-accessible storage media as recited in claim 16, storing further program instructions that when executed on or across the one or more processors further cause one or more computer systems to:

transform, based at least in part on semantic information pertaining to a particular message, a baseline schema into an enhanced schema, wherein the baseline schema comprises instances of a primitive data type, and wherein the enhanced schema comprises an instance of a non-primitive data type; and store the enhanced schema in the repository.

* * * * *